United States Patent [19]

Shiao-Chung Hu

[11] Patent Number: 4,651,264
[45] Date of Patent: Mar. 17, 1987

[54] POWER SUPPLY WITH ARCING CONTROL AND AUTOMATIC OVERLOAD PROTECTION

[75] Inventor: Jerry Shiao-Chung Hu, Sanford, N.C.

[73] Assignee: Trion, Inc., Sanford, N.C.

[21] Appl. No.: 687,511

[22] Filed: Dec. 28, 1984

Related U.S. Application Data

[63] Continuation-in-part of Ser. No. 647,456, Sep. 5, 1984, abandoned, which is a continuation of Ser. No. 416,025, Sep. 8, 1982, abandoned.

[51] Int. Cl.$^4$ ............................................ H02M 3/338
[52] U.S. Cl. ........................................ 363/18; 55/139; 323/903; 331/117 R; 361/235; 336/69; 336/189; 363/56; 363/61
[58] Field of Search .................. 363/18, 19, 37, 56, 363/75, 61; 323/903; 55/139; 331/112; 361/235; 336/69, 70, 189, 190, 191

[56] References Cited

U.S. PATENT DOCUMENTS

| | | | |
|---|---|---|---|
| 2,276,832 | 3/1942 | Dome | 363/30 |
| 3,295,041 | 12/1966 | Bize | 331/112 |
| 3,582,754 | 6/1971 | Hoffmann et al. | 363/18 |
| 3,702,961 | 11/1972 | Erickson | 363/19 |
| 3,928,703 | 12/1975 | Waltz | 363/19 |
| 4,007,413 | 2/1977 | Fisher | 363/18 |

FOREIGN PATENT DOCUMENTS

| | | | |
|---|---|---|---|
| 68886 | 5/1980 | Japan | 363/18 |
| 82/01627 | 5/1982 | PCT Int'l Appl. | 363/19 |

OTHER PUBLICATIONS

Pugh, "Geiger Counter with Transistor Power Supply", pp. 35–37, Jun. 1957.

Primary Examiner—William H. Beha, Jr.
Attorney, Agent, or Firm—Burns, Doane, Swecker & Mathis

[57] ABSTRACT

A power supply with automatic arcing control and overload protection includes an electronic switch in an oscillator circuit with a primary winding of a step-up transformer. A high voltage, secondary winding of the transformer is loosely magnetically coupled to the primary winding. The frequency of oscillation of the oscillator circuit decreases as a load impedance across the secondary winding of the transformer decreases. In the case of arcing or shorting of an output circuit of the power supply the frequency of oscillation decreases below a pass band of the output circuit, thereby reducing the output current of the power supply.

11 Claims, 7 Drawing Figures

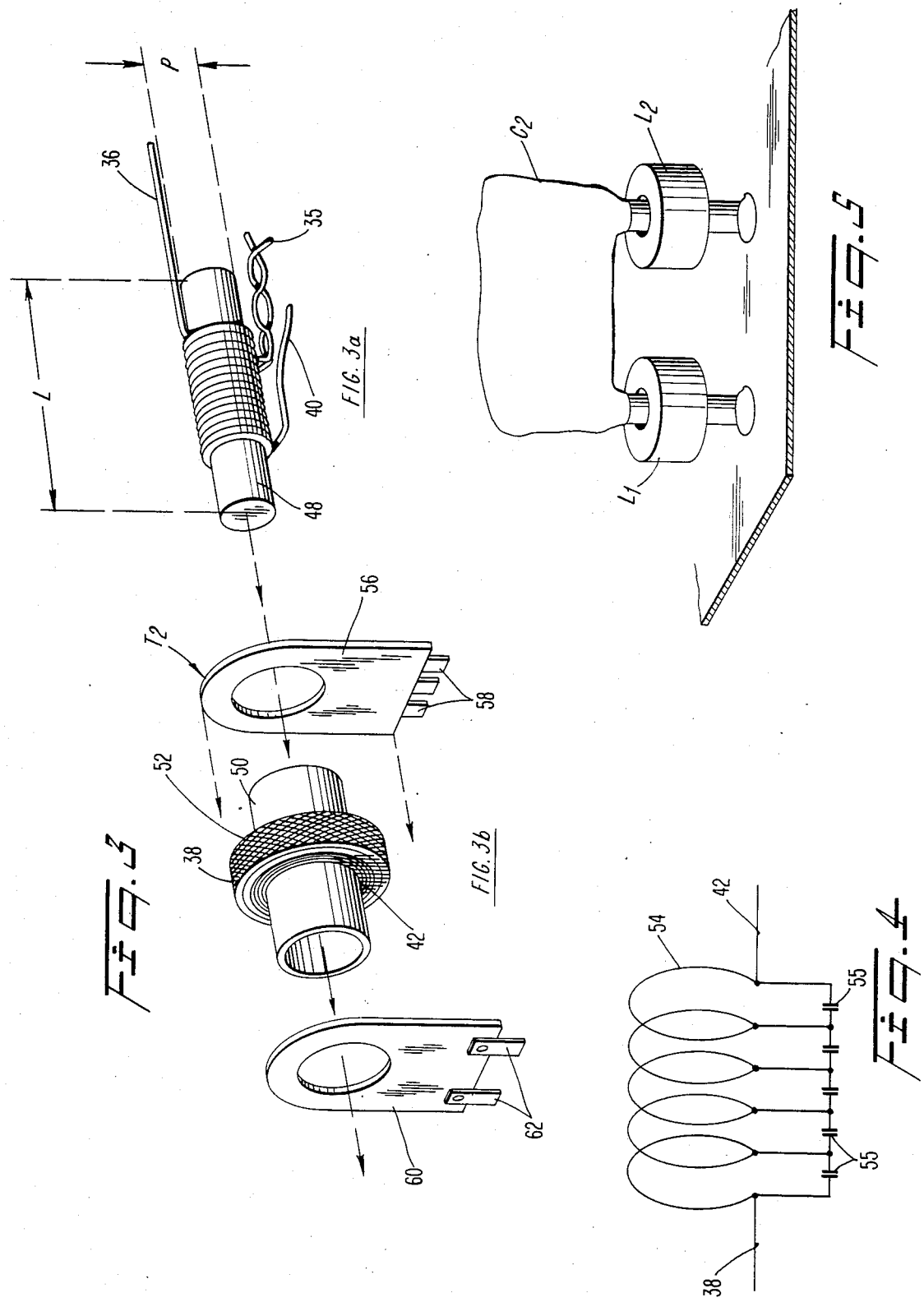

POWER SUPPLY WITH ARCING CONTROL AND AUTOMATIC OVERLOAD PROTECTION

RELATED APPLICATIONS

This application is a continuation-in-part of U.S. Ser. No. 647,456, filed Sept. 5, 1984, now abandoned, which is a continuation of U.S. Ser. No. 416,025, filed Sept. 8, 1982, now abandoned.

BACKGROUND OF THE INVENTION

The present invention relates to electronic power supplies with overload protection from frequent, intermittent or partial shorting of the power supply load. More specifically, the present invention relates to regulated direct current power supplies for providing a high level driving voltage for electrostatic precipitators.

Electrostatic precipitators are commonly employed to remove particulates from an air stream. In conventional precipitators, an ionizer is used to produce an electrostatis field to charge the contaminating particles. The charged particles are then accumulated in one or more collecting cells having plates or grids across which a voltage is applied to attract the charged particles. Such collecting cells are operated at high voltages, typically, at several thousand volts.

Particulates accumulating in the collector cells may cause frequent arcing or shorting of the high voltage power supply. In some situations, a low, but non-zero resistance current path may be created in the collecting cell. In other situations, virtually continuous grounding of the high voltage collector plates may occur. These effects can create high transient voltages or longer duration current surges which may damage the power supply circuits. Accordingly, it is an object of the present invention to provide a power supply for electrostatic precipitators with effective, automatic protection against frequent short circuiting (arcing) and long duration overloads.

In the prior art, fuses or circuit breakers have been used as overload protection for electrostatic precipitators. These devices have disadvantages due to the need to reset or replace them in the event of arcing, due to their lack of a graded response to varying types overload conditions encountered, and due to their typically slow response times. Also, frequent arcing may create a high level of noise.

Accordingly, it is an object of the present invention to provide automatic, fast acting circuit arcing control and overload protection which is responsive to the duration and degree of overload.

It is known in the art to employ ferro-resonant circuits in the high voltage transformer of a power supply for an electrostatic precipitator. Such a device is shown in FIG. 1. The circuit consists of a ferro-resonant transformer and a resonating capacitor $C_1$. The transformer core provides a closed magnetic loop. The remaining circuitry (diodes $D_1$ & $D_2$, resistors $R_1$ & $R_2$, and capacitors $C_2$ & $C_3$) operates as a high voltage doubler and provides rectification and filtering. Electrical isolation and energy limiting are achieved by use of a shunted core transformer. During normal operation, nearly all flux generated by the AC primary winding goes through core leg which couples the high voltage secondary winding, and energy is delivered to the load. Very little flux flows through the core shunt because of the high reluctance of this path in comparison with a secondary leg of the core. However, when arcing occurs, the energy stored in the collecting cell will discharge. The resistance of the secondary leg increases and nearly all the flux is shunted around the secondary leg.

While this circuit provides reasonably effective overload protection, it has certain disadvantages due to its cost, physical size and power consumption. In particular, the shunted transformer is bulky and expensive due to the size of the closed loop core and the number of windings needed to step up the 60 Hz, AC input voltage at the primary winding.

A number of short-circuit protection circuits employing electronic switching devices are known in the prior art. For example, U.S. Pat. No. 3,243,725 to Raposa et al discloses a voltage converter having as oscillator circuit employing a pair of push pull transistors and a pair of tapped transformers including a saturable transformer.

U.S. Pat. Nos. 3,772,853 to Burge et al, U.S. Pat. No. 3,877,896 to Muskovac and U.S. Pat. No. 4,061,961 to Baker relate to prior art devices for supplying power to electronic precipitators. Also of interest are the power supply circuits shown in U.S. Pat. No. 3,928,793 to Waltz and on page 36 of the June 1957 issue of *Radio and T.V. News*. The latter power supply employs a low voltage miniature audio step up transformer. Of more general interest are U.S. Pat. No. 4,007,413 to Fisher et al directed to a self oscillating converter circuit and U.S. Pat. No. 4,318,164 to Onodera et al directed to a high frequency switching circuit.

It is an object of the present invention to provide a power supply with automatic short circuit protection which is easily and inexpensively fabricated.

It is another object of the present invention to provide a high voltage power supply employing a high frequency step-up transformer with a small, light weight core.

It is another object of the present invention to provide a power supply with automatic short circuit protection employing a high frequency electronic oscillator and a single high voltage, high frequency transformer.

It is another object of the present invention to provide a power supply with automatic arcing control and short circuit protection which is small in size and weight and consumes a minimum of electric power.

These and other objects and features of the invention will become apparent from the claims and from the following description when read in conjunction with the accompanying drawings.

SUMMARY OF THE INVENTION

The present invention relates to a circuit for converting a low voltage signal into a high voltage signal with automatic arcing and overload protection. The circuit may include an oscillator having an electronic switch and an L-C feedback loop for determining the frequency of oscillation. The L-C feedback loop may include at least a portion of a primary winding of a step-up transformer. The transformer may be constructed so that the primary winding and secondary winding of the transformer are loosely inductively coupled through a ferrite rod. The inductive coupling is such that changes in impedance are reflected into the primary winding thereby shifting the frequency of oscillation. In an arcing or overload condition the frequency of oscillation of the oscillator may be shifted outside a frequency pass band of the secondary winding and voltage multiplier circuit, thus reducing the energy passed therethrough. As a result input current and power provided to the oscillator will be reduced, thereby inhibiting damage to the circuit.

In a preferred embodiment of the present invention, the secondary winding is wound to provide inherent capacitance, which, in combination, with other elements in the secondary winding circuit, creates a passband or band trapper circuit with a center frequency near the frequency of oscillation of the oscillator under normal operating conditions. In particular, a resistive element and a capacitance element may be connected in circuit with output terminals of the secondary winding. The secondary winding is, itself, a capacitance and induct element, which, in combination with the resistive and capacitance elements, constitutes a band trap circuit and a high voltage multiplier circuit. A load may be placed in parallel with the resistive element in an output circuit of the device. Impedance changes the output circuit are reflected to the primary winding, which is a part of the oscillator circuit. When the oscillator operates near the center frequency of the pass band of the band trapper circuit, the maximum energy will pass through the coupling of primary and secondary windings. Impedance changes in output circuit caused by arcing, overloading or shorting will shift the operating frequency of oscillation, and only a portion of the energy will pass through band trapper circuit of the power supply.

BRIEF DESCRIPTION OF THE DRAWINGS

FIG. 3 is an exploded view of a step-up transformer $T_2$ employed in the circuit of FIG. 2.

FIG. 4 is a schematic diagram indicating electrical properties of the transformer $T_2$ employed in the circuit of FIG. 2.

FIG. 5 is a pictorial view of the combination of circuit elements $L_1$, $L_2$ and $C_2$ shown in FIG. 2.

DETAILED DESCRIPTION OF PREFERRED EMBODIMENTS

A preferred embodiment of the present invention is a power supply for providing high level DC voltage for driving an electrostatic precipitator. The circuit contains an oscillator having an electronic switch and an L-C feedback loop which includes a band trap circuit. Overload protection is provided by automatic variations in the frequency of an output signal of the oscillator.

Figure 1:
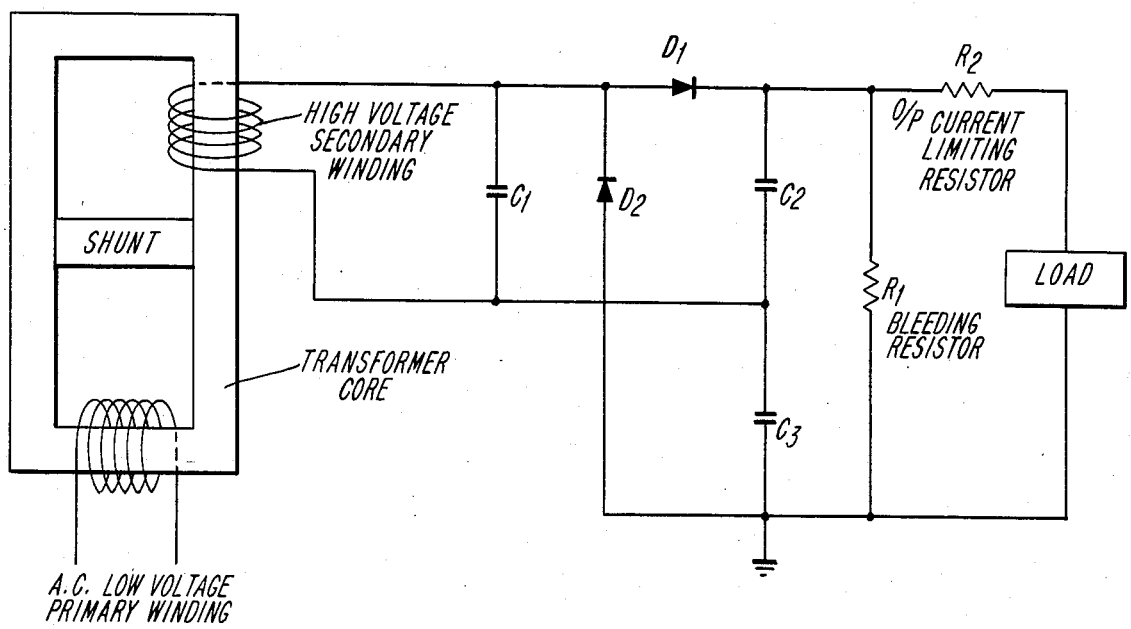
FIG. 1 is a schematic digram of a prior art power supply employing a ferro-resonant circuit, discussed above.
Figure 2:
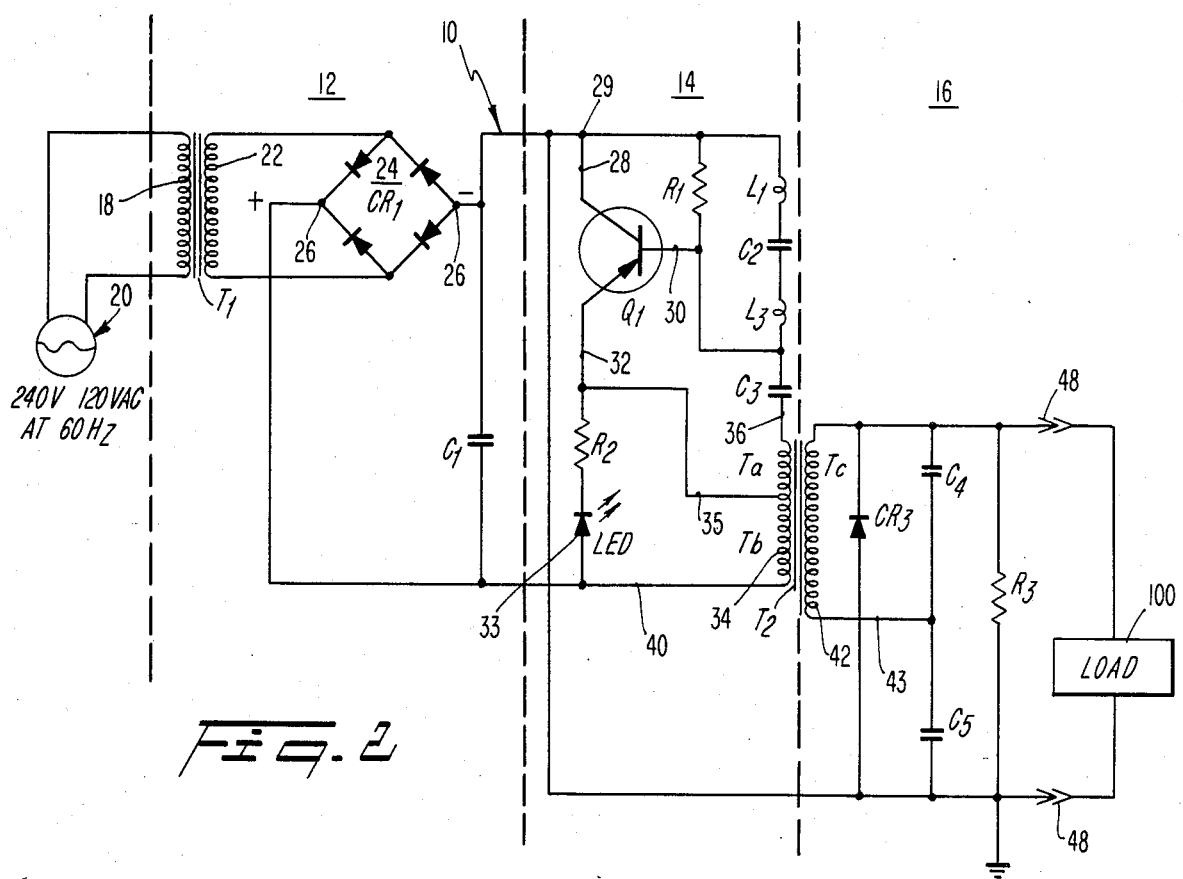
FIG. 2 is a schematic diagram of a power supply circuit with automatic overload protection in accordance with a preferred embodiment of the present invention.

Turning first to FIG. 2, a schematic circuit diagram for a power supply with automatic arcing control and overload protection is denoted generally by the numeral 10. For the purposes of this description, the circuit of FIG. 2 has been divided into three portions separated by dotted lines. The first portion 12 is a low voltage power supply. The second portion 14 is a low voltage, high frequency circuit including a primary winding of the high voltage step-up transformer $T_2$. The low voltage circuit 14 includes a high frequency oscillator and a feedback loop. The third portion of the circuit 16 is a high voltage secondary circuit including the secondary windings of the transformer $T_2$ and a voltage doubler. A load 100 may be connected in an output circuit of the power supply.

The low voltage power supply 12 may include a step-down transformer $T_1$. Primary windings 18 of the transformer $T_1$ may be connected to a line voltage input source 20, typically 120 volts at 60 hertz. A secondary winding 22 may be connected to a full wave bridge 24 in the conventional manner so that a rectified AC signal appears at terminals 26. In the embodiment described below in which particular circuit component values are listed, the amplitude of the DC voltage at the terminals 26 is about 24 volts.

The circuit portion 14 includes a solid state switch such as transistor Q and an LC feedback loop. A series combination is formed of a capacitor $C_2$ with two inductors $L_1$ and $L_2$. This series combination may be provided by placing a ferrite bead on each of the leads of the capacitor $C_2$ as shown in FIG. 5. This structure, a resistor $R_1$, and the collector of the transistor Q may be connected to a negative terminal of the bridge rectifier. As shown, the capacitor $C_2$ with ferrite beads and resistor $R_1$ are in parallel with the collector base junction of the transistor $Q_1$.

A base terminal 30 of the transistor $Q_1$ is connected to an emitter terminal 32 of the transistor via an L-C series combination including a capacitor $C_3$ and a portion $T_A$ of a primary winding 34 of the step-up transformer $T_2$.

The high voltage, secondary circuit 16 includes the secondary winding 42 of the transformer $T_2$. First and second terminals 38 and 43 of the step-up transformer $T_2$ are connected to a voltage doubler circuit. The voltage doubler circuit may comprise a two-leg, parallel combination, each leg including the series combination of a capacitor C and a diode CR. More specifically, the terminal 38 of $T_2$ is connected to the negative end of rectifier $CR_2$ and positive end of $CR_3$. The terminal 43 of $T_2$ is connected to one end of each of capacitors $C_4$ and $C_5$. The other end of capacitor $C_4$ is connected to the positive end of rectifier $CR_2$ at node 44. This node is a DC high voltage output. The other end of capacitor $C_5$ is connected to ground. A bleeder resistor $R_3$ is connected across the output terminals 48. The circuit load, such as the ionizer and collecting cell of an electrostatic precipitator, is indicated generally as load 100. The nominal output voltage of the circuit is about 6000 V, when the circuit components listed below are employed.

The capacitor $C_3$ is connected in series with the feedback coil portion $T_a$ which constitutes a portion of the primary winding of $T_2$. It is connected in parallel with the emitter-base junction of transistor $Q_1$. A power coil portion $T_b$ of the primary winding 34 is connected to the emitter terminal 32 of the transistor $Q_1$. Terminal 40 of the primary winding 34 is connected to the positive terminal of bridge rectifier. Resistor $R_2$ in series with LED 33, are connected in series between emitter terminal of transistor $Q_1$ and the positive terminal of bridge rectifier. The LED provides an indicating light.

The structure of the step-up transformer $T_2$ will now be discussed in greater detail. As shown in FIG. 3, the primary winding of step-up transformer $T_2$ is wound on a cylindrical ferrite rod 48, with a tap 35 between one end terminal 36 of the winding and the other end terminal 40 of the winding. The coil between terminal 36 and tap 35 is the feedback coil portion $T_A$. The coil between tap 34 and terminal 40 is the power coil portion $T_b$. In a preferred embodiment, the ferrite rod may be 2 inches in length and ⅜ inch in diameter.

Using #38 AWG wire, the secondary winding comprises 3100 to 3200 turns in a preferred embodiment. A secondary winding 52 is universally wound on an insulated tube 50. The secondary winding is wound helically at a predetermined angle or pitch—in preferred embodiments 20° to 25°. This relationship is provided to establish a desired capacitance between the turns. The result is the resonating tank circuit depicted schematically in FIG. 4.

The secondary winding 52, sleeved tightly on the primary winding, becomes a part of the oscillation coil of the oscillator. Distributed inductance 54 and distributed, inherent capacitance 55 of the secondary winding 52, in association with the high voltage multiplier constitute a resonant, or band-trapper circuit. Typical frequency pass bands ranges for such a coil have been observed between 45 to 72 KHZ. Preferred center frequencies for said pass bands lie between 45 and 55 KHZ. Such pass bands include the predetermined oscillation frequency 50 KHZ of a preferred embodiment.

Figure 6:
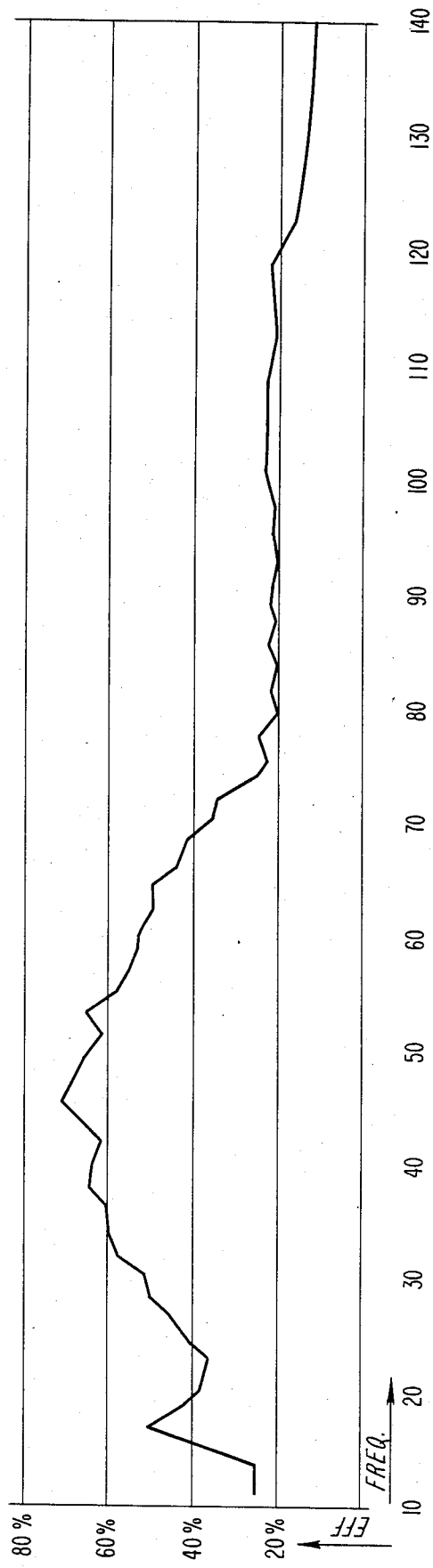
FIG. 6 is a graphical representation of coupling efficiency at a transformer circuit of the present invention as a function of frequency.
Figure 7:
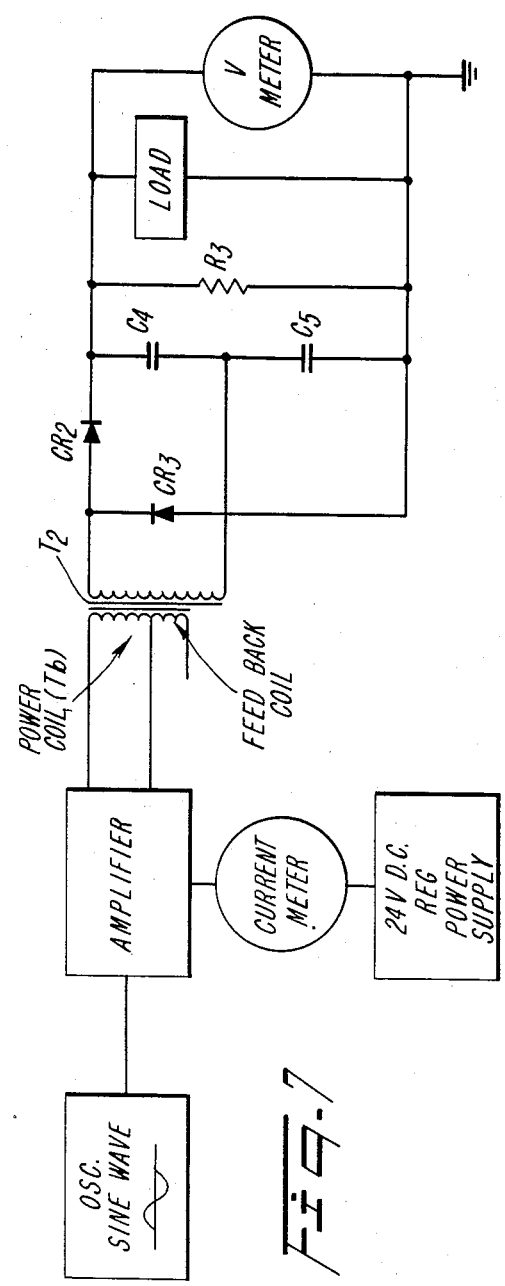
FIG. 7 is a schematic diagram of a test circuit from which the data shown in FIG. 6 was obtained.

The pass band characteristics of a typical transformer circuit employed in embodiments of the present invention is depicted graphically in FIG. 6. The data from which FIG. 6 was prepared was obtained from the test circuit shown in FIG. 7.

In FIG. 6 coupling efficiency is plotted as a function of oscillator frequency. For purposes of the presentation, coupling efficiency is defined as the ratio of output power to input power, employing a 2.4 megaohm load resistor. As shown in FIG. 6, the approximate center frequency of the pass band of the transformer circuit is about 46 KHZ. The coupling efficiency drops from a high of about 71% at 40 KHZ to low values on either side of that frequency. In particular the coupling efficiency drops by about 30% at ±25 KHZ from the center frequency.

With continued reference to FIG. 3, end boards 56 and 60 of the transformer $T_2$ function as mounting brackets and soldering terminals. The beginning terminal 42 of secondary winding and the terminal 38 of the secondary winding are soldered to lugs 62. The position of those lugs depends on printed circuit board arrangement. Likewise the tap 35 and terminals 36 and 40 are each soldered to one of the lugs 58. Again the position of the lugs depends on printed circuit board arrangement.

When the load circuit is opened, the coupling between the primary and secondary windings is about 80%. The physical geometry of the core and coils provides loose coupling to transfer power to the load and provide for overload protection and automatic recovery as will be discussed in greater detail below.

The primary winding of the high voltage transformer $T_2$ is tapped to provide the low voltage needed for the oscillator circuit described above. In the circuit embodiment for which component values are specified below, the number of windings between the first end terminal 36 and the tap 34 is two to two and one-half turns, and the number of windings between the tap 34 and the second terminal 40 of the primary windings may be 12 to 13 turns.

The following is a listing of typical component values for the circuit of FIG. 2:

$T_1$—Step-down transformer; From an AC power source 120 V or 240, 60, or 50 Hz; Step-down to 24 V
$CR_1$—Bridge rectifier, 100 V RMS 2 amp
$C_1$—470 MFD, 63 V
$Q_1$—Transistor, MJ2955
$R_2$—Resistor, 6.8K ohms ¼ watt
LED—Light emitting diode
$R_1$—Resistor, 3.3K ohms, ½ watt (Alternatively a 3.3K ohm resistor in series with a 0–20K ohm potentiometer may be employed.)
$L_1$ & $L_2$—Ferrite beads
$C_2$—Capacitor, 0.033 MFD, 100 VDC
$C_3$—Capacitor, 3.3 MFD, 100 VDC
$T_2$—See FIG. 3
$CR_2$ & $CR_3$—Rectifiers, 12 KVDC, 20 MA
$C_4$ & $C_5$—Capacitors, 470 pf, 7.5 KVDC
$R_3$—Resistor, 500 Megohms, 2 watt

OPERATION

When the power is turned on, a low DC voltage is applied between node 29 and terminal 40. $R_1$, $C_2$, $C_3$ and the primary winding of $T_2$ act as a voltage divider for this D.C. voltage. The feedback coil $T_a$, power coil $T_b$ and ferrite rod 48 act as an auto transformer. The emitter-base voltage of transistor $Q_1$ increases until the transistor become conductive. When this occurs, a large amount of current freely flows through the power coil portion of transformer $T_b$. This causes the voltage between tap 35 and terminal 40 of $T_2$ to collapse. Consequently, the emitter-base voltage drops, and the transistor becomes nonconductive. The process repeats itself as the voltage across the primary winding of step-up transformer starts building again. For a circuit employing the components listed above, a high frequency oscillation occurs at a predetermined frequency F of about 50 KHZ±5 KHZ.

As described above, there is a large amount of high frequency current flow through power coil ($T_b$). This oscillating current will be coupled to the secondary winding of transformer $T_2$ when the frequency of oscillation approximately matches the designed frequency range of the band trapper circuit. The signal is then voltage multiplied and applied to the load. As FIG. 5 shows, two ferrite beads $L_1$ and $L_2$ encircle the leads of capacitor $C_2$. That serves as a choke coil to reduce the Q value of the oscillator circuit so that an exact match of the oscillating frequency to the frequency range of the band trapper circuit is not required.

The following are typical specifications for the circuit embodiment of the present invention discussed above:

Input voltage—120 VAC at 60 Hz
Input current—320 mA
Output open circuit voltage—10 KVDC max.
Output load circuit voltage—(adjusted by 0–20K ohm potentiometer listed above)
  Low: 6 KVDC at 0.3 mA min.
  High: 6.8 KVDC at 2.0 mA max.
Output short circuit current—4.5 mA max.
Output arcing control—when output is arcing, the input current will reduce.
Output shorting protection—when output is shorted, the input current will reduce to 50% or more of current draw.

Operating frequency—50 KHZ±5 KHZ
Size—7¾"×3¼"×3"
Weight—2 pounds

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A power supply for providing high level D.C. voltage and having automatic arcing control and short circuit protection and recovery, comprising:
   a source of low level D.C. voltage;
   a step-up transformer having low voltage primary windings, wound on a ferrite rod and connected to said source of low level D.C. voltage, and secondary windings wound on said primary windings in a manner so as to effectively comprise a filter having a pass band centered at a predetermined frequency;
   a voltage multiplier circuit connected between said secondary windings and an output circuit of the power supply; and
   an L-C feedback loop, which includes a portion of said primary windings and a solid state switching device connected to said source of low level D.C. voltage, to provide an oscillating input voltage to said primary windings at approximately said predetermined frequency under normal load conditions in the output circuit and to automatically reduce the frequency of oscillation when shorting or arcing occurs in the output circuit.

2. The power supply of claim 1 wherein the switching device is a transistor with an emitter terminal connected to a tap in the primary windings, with a base terminal connected to a first terminal of the primary windings through a first capacitor which forms at least a portion of the capacitance in said L-C loop, and with a collector terminal connected to the low level D.C. voltage source.

3. The power supply of claim 2 further including a resistor which connects the base terminal of the transistor to the low level D.C. voltage source.

4. The power supply of claim 3 wherein said L-C loop further comprises an inductance means in series with a second capacitor to reduce the Q of an oscillator circuit formed by said transistor and L-C feedback loop.

5. The power supply of claim 4 wherein the inductance means comprises at least one ferrite member encircling a lead of the second capacitor.

6. The high voltage power supply of claim 1 wherein the pass band of the secondary winding circuit is defined by inherent capacitance of the secondary winding.

7. The high voltage power supply of claim 6 wherein the secondary winding is universally wound on said primary winding at an angle of from 20° to 25°.

8. A power supply for providing high level D.C. voltage for driving an electrostatic precipitator, comprising:
   a source of low level D.C. voltage;
   a step-up transformer having a low voltage primary winding connected to said source of low level D.C. voltage, said low voltage primary winding being loosely magnetically coupled to a high voltage secondary winding,
   said primary winding having a first, feedback portion and a second, power portion, connected in series; and
   said secondary winding having inherent capacitance such that a circuit in which said secondary winding is connected has a predetermined resonant frequency;
   a voltage multiplier circuit connected between said secondary winding and an output circuit of the power supply, and
   an L-C feedback loop which includes said feedback portion of said primary winding and a solid state switching device connected to said voltage source to provide an oscillating input voltage to said power portion of said primary windings at approximately said resonant frequency,
   wherein a lowered load impedance in the output circuit is reflected through the transformer to the L-C feedback loop and reduces the frequency of oscillation of the oscillating input voltage applied to the power portion of the transformer to a frequency sufficiently below said resonant frequency to reduce the current in the output circuit to prevent overload of the power supply.

9. The power supply of claim 8 wherein the primary windings are wound on a ferrite rod and the secondary windings are wound on the primary windings.

10. The power supply of claim 8 further comprising means for reducing the Q of an oscillator formed by said switch device and LC feedback loop.

11. The power supply of claim 8 wherein said resonant frequency is between 45 and 55 KHZ and wherein coupling efficiency of the transformer in circuit is reduced by about 30% at ±25 KHZ from said frequency.

* * * * *